United States Patent [19]

Wagner

[11] 3,737,008
[45] June 5, 1973

[54] LUBRICATING DEVICE FOR A DRIVING WORM ENGAGING A STATIONARILY ARRANGED WORM GEAR RACK

[75] Inventor: Hans O. Wagner, Buttgen-Vorst, Germany

[73] Assignee: Schiess Aktiengesellschaft, Dusseldorf-Oberkassel, Germany

[22] Filed: Feb. 14, 1972

[21] Appl. No.: 225,817

[30] Foreign Application Priority Data

Feb. 13, 1971 Germany..................P 21 06 917.0

[52] U.S. Cl.................................184/6.14, 74/424.6
[51] Int. Cl.................................................F16h 1/20
[58] Field of Search...................74/424.6, 468, 425; 184/6.12, 6.14

[56] References Cited

UNITED STATES PATENTS 3,109,514  11/1963  Deflandre........................184/6.14 X
3,323,385  6/1967   Revitt..............................74/424.6 X
3,415,138  12/1968  Rumbarger et al..............74/424.6 X
3,448,631  6/1969   Sullivan..........................74/424.6 X
3,595,100  7/1971   Stark et al. ....................184/6.12 X Primary Examiner—Manuel A. Antonakas
Attorney—Walter Becker

[57] ABSTRACT

A lubricating device for a driving worm which meshes with a stationary worm gear rack and drives a machine tool part, according to which the gear rack has control pistons movably arranged therein which normally prevent fluid communication between a lubricant supply conduit and bores in said rack which bores lead to the worm teeth flanks. These pistons when actuated by control bar means connected to the machine tool part are by the control bar means moved into position for establishing communication between the lubricant supply conduit means and the respective adjacent worm teeth flanks.

6 Claims, 9 Drawing Figures

LUBRICATING DEVICE FOR A DRIVING WORM ENGAGING A STATIONARILY ARRANGED WORM GEAR RACK

The present invention relates to a lubricating device for a driven driving worm which meshes with a stationarily arranged worm gear rack. In particular, the present invention relates to a driving worm of the type just mentioned which pertains to a machine element of a machine tool which element is taken along by the driving worm and is movable along the gear rack. Connecting bores extend through the gear rack and lead into lubricating pockets of the tooth flanks while through the connecting bores the lubricant is under pressure conveyed to the lubricating pockets of those teeth of the gear rack which mesh with the driving worm.

Lubricating devices of this type have become known, for instance, by U. S. Pat. No. 3,323,385 and German Offenlegeschrift No. 1,650,745. According to these known lubricating devices, together with the worm and the machine element taken along by the worm, directly adjacent the gear rack there is moving a slide or carriage which has a lubricant supply passage from which distributing bores lead to the gear rack in which there are provided connecting bores which in a direction transverse to the gear rack lead to the flanks of the teeth while the lubricant introduced into the slide or carriage is discharged through the connecting bores. Due to the fact that the slide moves together with the worm and has the same length as the worm it will be assured that the lubricant will through the connecting bores in the gear rack be discharged from the gear flanks only in that region of the gear rack which meshes with the worm.

With the heretofore known lubricating devices under consideration, the problem involved consists above all in obtaining a seal between the slide and the gear rack within the region of the lubricant transfer. With the heretofore known lubricating devices it is necessary under all circumstances that the individual gear rack sections are precisely identical and fit together which means that the abutment areas must be located precisely in a plane. Moreover, the gear rack sections must engage each other so tightly that when the carriage passes thereover no oil under pressure can flow or enter therebetween. This high precision during the manufacturing process and the assembly requires considerable time and causes considerable costs.

It is, therefore, an object of the present invention so to design a lubricating device of the above mentioned type that a slide or carriage which by the worm is moved along the gear rack and through which the lubricant is conveyed to the connecting bores in the gear rack will become superfluous so that the above mentioned sealing problems will be eliminated.

This object and other objects and advantages of the invention will appear more clearly from the following specification in connection with the accompanying drawings, in which.

Figure 1:
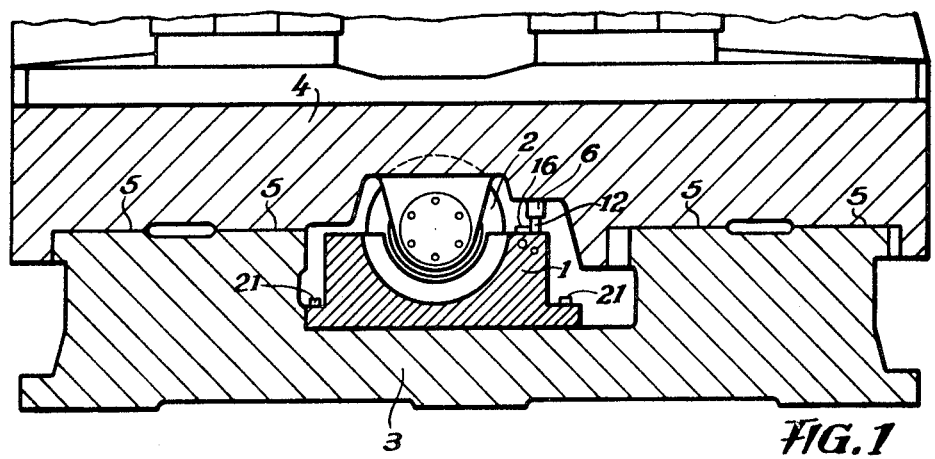
FIG. 1 is a section through the bed of a machine tool and a stand which rests on the bed and is movable by means of a driven worm, the worm of the stand meshing with a gear rack connected to the bed.

The lubricating device according to the present invention is characterized primarily in that in longitudinal direction of and through the gear rack there is provided a lubricant feeding bore which communicates with a source of lubricant under pressure and which intersects with cylindrical bores that are arranged perpendicularly with regard to the lubricant feeding bore and which are spaced from each other by at least one tooth pitch. In the cylindrical bores there are provided control pistons which are adapted by means of a control bar having the length of the worm and being connected to the movable machine element to be moved against the thrust of spring means. These control pistons, when pressed inwardly by the control bar, establish communication between the lubricant feeding bore and a distributing bore which interconnect the cylindrical bores in longitudinal direction of the gear rack. From the distributing bore a connecting bore extends for each gear flank of the gear rack, and these connecting bores respectively lead to a gear flank of a tooth.

In conformity with the present invention, the lubricant feeding bore in the worm gear rack is always supplied with a lubricant under pressure. From this lubricant feeding bore the lubricant, while being controlled by the control pistons, is discharged through the connecting bores in the gear rack to the gear flanks of the teeth within the working range of the worm, while the control of the control pistons is effected by means of a control bar. The lubricant is thus supplied, without the lubricant passing through an element which is moved with the worm, directly through the stationary gear rack, the control pistons of which are through the intervention of the control bar moved directly by the moved machine element, into the two working positions.

According to a further development of the invention, the connecting bores may each be provided with a choke in order to assure a uniform passage of the lubricant from the distributing bore through the connecting bores.

According to one design of the present invention, each control piston may have a reduced section the length of which somewhat exceeds the distance between those walls of the lubricant feeding bore which face each other and belong to the lubricant feeding bore and the distributing bore respectively so that in the starting position the reduced section will be in communication only with the lubricant feeding bore whereas in the working position of the control piston the reduced section will establish communication between the lubricant feeding bore and the distributing bore as a result of which the lubricant can on both sides of the respective actuated control piston pass into the distributing bore which, however, is blocked by the respective control pistons which are not actuated by the control bar and consequently still occupy their starting position.

According to another embodiment of the invention, the control piston may be provided with two annular grooves which are arranged in spaced relationship with regard to each other and which are spaced from each other by such a distance that, when the control piston is in inwardly moved position, the groove space of one annular groove communicates with the lubricant feeding bore, whereas the groove space of the other annular groove communicates with the distributing bore, and that the two annular grooves communicate with each other through transverse bores and a longitudinal bore. According to this design, in view of the distance between the annular grooves, in the starting position only that one annular groove communicates with the lubricant feeding bore the communication of which with the distributing bore is established only by the displacement of the control piston into working position against spring force. In this working position, the lubricant passes from the lubricant feeding bore through one annular groove, the transverse bore thereof, through the longitudinal bore, and through the transverse bore of the second annular groove into the second annular groove and from the latter into the distributing bore from which the lubricant through the connecting bores can pass through the flanks of the teeth which mesh with the worm.

When a gear rack is involved which is composed of a plurality of gear rack sections, it is provided according to the present invention that sealing bushings are inserted into the lubricant feeding bore and the distributing bore within the respective range of the gear rack joints, which sealing bushings bridge the joints. These sealing bushings, while permitting the passage of the lubricant over the entire length of the gear rack through the bores, prevent the lubricant from entering the joints or the gaps between the joints.

Referring now to the drawings in detail, FIG. 1 illustrates by way of example the association of the worm gear rack 1 and worm 2 meshing therewith with the stationary bed 3 of a machine tool on the bed 3 of which the machine stand 4 is displaceable. To this end, between the supporting and guiding surfaces 5 of bed 3 and machine stand 4 there is mounted the motor-driven worm 2 which meshes with the worm gear rack 1 which by means of screws 21 is connected to the machine bed 3. As mentioned above, the problem underlying the present invention consists in feeding oil under pressure as lubricant to the flanks of the worm gear rack 1 and the flanks of worm 2 and, more specifically, substantially only in that range in which the worm gear rack 1 and worm 2 mesh with each other. To this end, below and to the stand 4 and in the region of the worm gear rack 1 there is fastened a control bar 6 the maximum length of which corresponds to the length of worm 2 and which with the displacement of the stand 4 on bed 3 at the range of engagement of worm 2 with gear rack 1 actuates control pistons 12 which free the supply of oil under pressure in the range of the worm 2. This is more specifically illustrated in connection with two embodiments and the following figures of the drawings.

Figure 2:
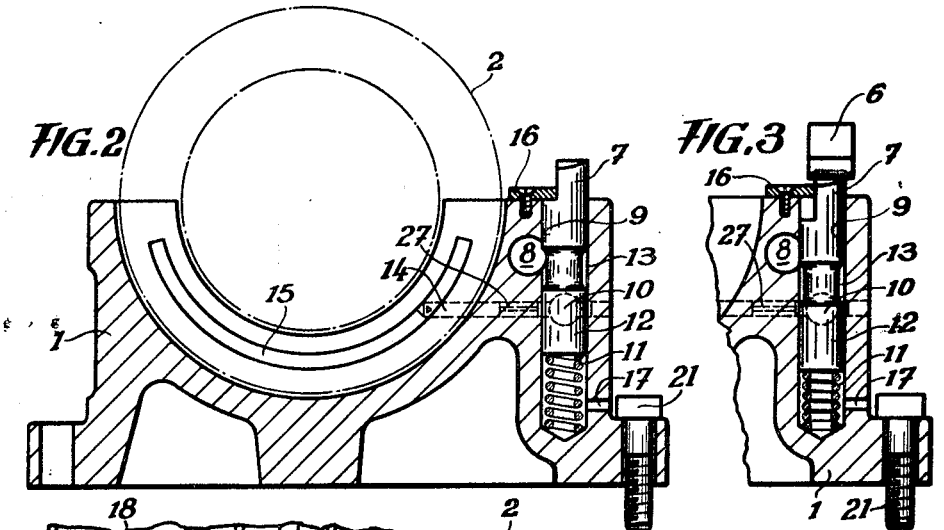
FIG. 2 represents a section through the worm gear rack with control piston, the worm meshing with the worm gear rack being shown in dot-dash lines.
Figure 3:
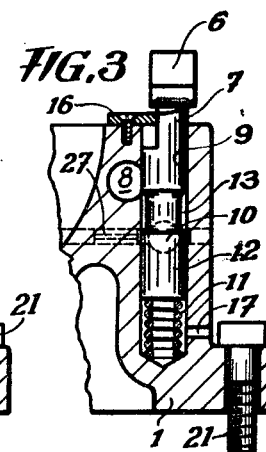
FIG. 3 shows a cutout of FIG. 2 with the control piston displaced by the control bar.
Figure 8:
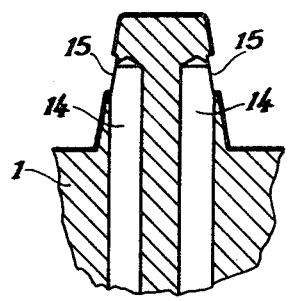
FIG. 8 illustrates on a larger scale than that of the preceding figures a section through a tooth of the worm gear rack with pockets for the oil under pressure with connecting bores.

As will be evident from FIGS. 2 and 3, on one side and through the length of the worm gear rack 1 there extends a pressure oil feeding bore 8 which through a non-illustrated pressure pump communicates with an oil storage container. Spaced from each other by a plurality of tooth pitches and distributed over the length of the gear rack 1 there are provided cylinder bores 9 which extend perpendicularly with regard to the feeding bores 8 for the oil under pressure. The cylinder bores 9 intersect with the oil feeding bore 8 so that between bore 8 and the cylinder bores 9 a communication is established. Furthermore, in the longitudinal direction and through the gear rack 1 there is provided a distributing bore 10 having a diameter which is less than the diameter of the cylinder bores 9. The cylinder bores 9 communicate with each other through bore 10. In each of the cylinder bores 9 there is provided a pressure spring 11 on which control pistons 12 respectively rest. Each control piston 12 comprises a section 13 which is reduced in diameter within the region of the oil feeding bore 8. The length of the section 13 is so dimensioned that in case of a displacement of the control piston 12 from the position shown in FIG. 2 to the position shown in FIG. 3, the section 13 reduced in diameter establishes a connection between bore 8 and bore 10 so that the oil in bore 10 can pass along the reduced section 13 into bore 10 from which the oil under pressure can flow to the flanks of the gear rack teeth and to the flanks of the worm 2. To this end, there are provided connecting bores 14 which extend perpendicularly with regard to the cylinder bore 9 toward the worm 2. Each flank of each tooth of gear rack 1 has associated therewith a bore 14 which leads into an arched pocket 15 provided in the flank as is particularly clearly shown in FIGS. 6 and 8.

The position of each control piston 12 is in its starting phase determined by the spring 11 in the cylinder bore 9 and by the arresting strip 16 screwed onto the gear rack 1. Strip 16 limits the outward movement of the control pistons 12 by the thrust of spring 11. At the lower end of the cylinder bore 9 in gear rack 1 there is provided a venting bore 17 which connects the chamber of the cylinder bore 9 with the atmosphere.

Figure 5:
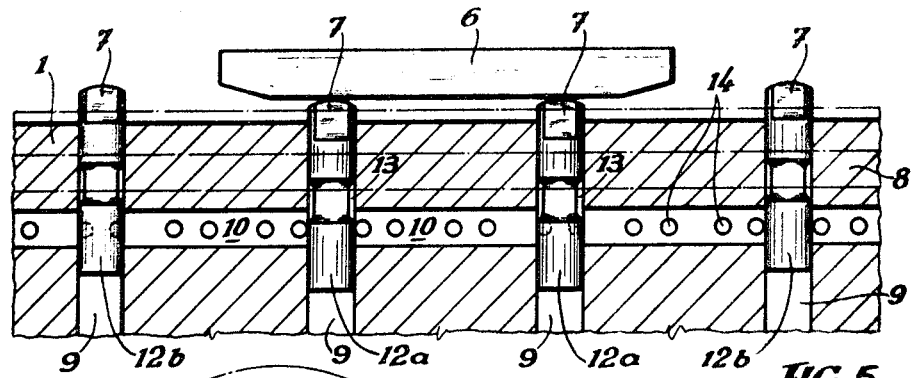
FIG. 5 is a longitudinal section through the gear rack perpendicular with regard to the section of FIG. 4.

In the position shown in FIG. 2, the communication between the bore 8 and the bore 10 is blocked by the control piston 12. When the control bar 6 connected to the stand 4 during the displacement of stand 4 moves over the upper protruding end 7 of the control piston 12, as is clearly shown in FIGS. 3 and 5, the respective control pistons 12 over which the control bar 6 has moved are against the thrust of springs 11 moved into the cylinder bores 9 whereby due to the reduced section 13 a communication is established between bores 8 and 10. As a result thereof, the oil under pressure can at both sides of the actuated control piston 12 distribute itself into the bore 10 and can pass therefrom through connecting bores 14 into the oil pockets 15 in the flanks of those teeth of gear rack 1 which are in engagement with the flanks of worm 2.

Due to the fact that in this connection those control pistons 12 which are not actuated by the control bar 6 remain in their position shown in FIG. 2, only that length of bore 10 is supplied with oil which corresponds to the length of worm 2, and consequently also the passage of oil through the connecting bores 14 to worm 2 is limited to this range. This is particularly clearly shown in FIG. 5 according to which the control pistons 12a are by the control bar 6 in conformity with FIG. 3 moved farther into the cylinder bores 9 than the control pistons 12b so that within the range of the control pistons 12a the communication between bore 8 and bore 10 is established, whereas the control pistons 12b which do not engage the control bar 6 block the passage of oil under pressure into the bore 10. In order to assure a uniform oil flow through the connecting bores 14, chokes 27 are respectively arranged in the connecting bores as is clearly shown in FIGS. 2-4.

Figure 4:
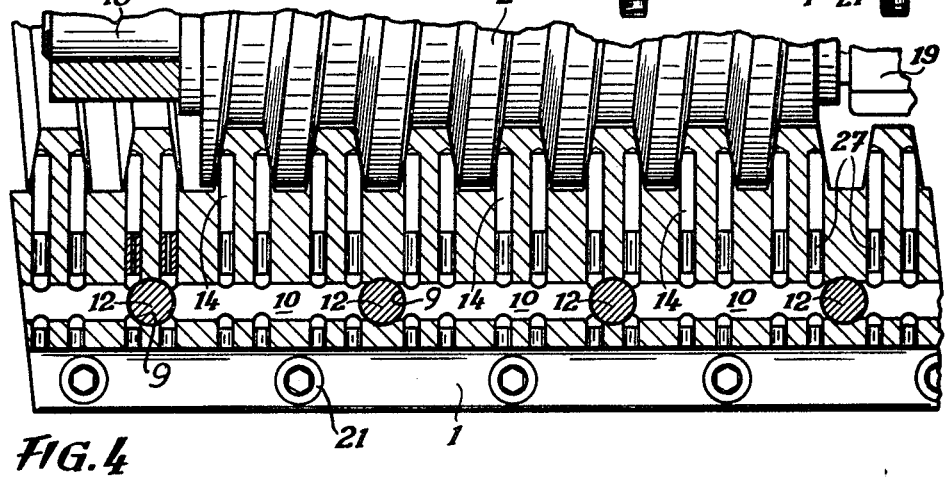
FIG. 4 represents a longitudinal section through the worm gear rack with the connecting bores provided therein, the worm gear rack meshing with the worm.

FIG. 4 also shows the bearing 18 for worm 2 the other end of which is engaged by the worm drive 19(only diagrammatically indicated). The bearing 18 as well as the worm drive 19 are similar to the control bar 6 fixedly connected to the stand 4.

The embodiment of FIGS. 6 and 7 differs from that of the preceding figures in that the bore 8 for feeding the oil under pressure is located in a plane below instead of above the distributing bore 10, and that furthermore the control piston 12a instead of being provided with one section 13 reduced in diameter has two axially spaced reduced sections in the form of annular grooves 22 and 23. These grooves 22 and 23 communicate with each other through transverse bores 24 and a longitudinal bore 25 within the control piston 12a. From the oil feeding bore 8 in the starting position of control piston 12a according to FIG. 6, oil under pressure passes only into the annular groove 23 and from there is distributed through the longitudinal bore 25 into the annular groove 22. If the control piston 12a is by means of the control bar 6 displaced in conformity with FIG. 7, the oil under pressure is able to pass from the annular groove 22 into the distributing bore 10 from which the oil under pressure then flows through chokes 27 and connecting bores 14 into the oil pockets 15.

Figure 6:
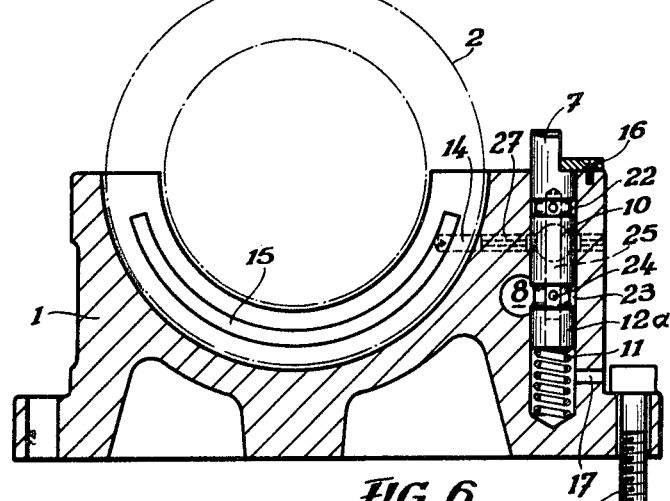
FIG. 6 is a section through the gear rack similar to that of FIG. 2, however, with a different arrangement and design of the control piston.
Figure 7:
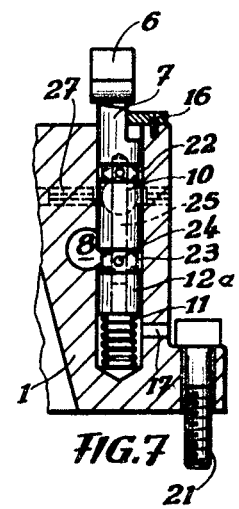
FIG. 7 shows a cutout of FIG. 6 with the control bar acting upon the control piston.

Over the above described embodiment, the embodiment of FIGS. 6 and 7 permits a narrower structure and the connecting bores 14 in the worm gear rack 1 can therefore be made shorter.

The arrangement of the oil feeding bore 8 along the gear rack 1, the bore 8 always being supplied with oil under pressure, and of the distributing bore 10 substantially parallel to the feeding bore 8 will in cooperation with the control pistons 12a and the control bar 6 make possible a continuous supply of oil to the arched pockets 15 in those flanks of the teeth of gear rack 1 which are respectively engaged by the flanks of worm 2, whereas no oil is fed into the other pressure oil pockets 15, and thus cannot flow off without having exercised a lubricating effect.

Figure 9:
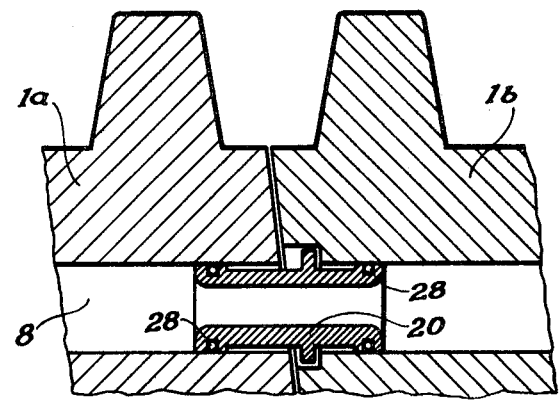
FIG. 9 shows a portion of a section through the worm gear rack within the region of the joint of two gear rack sections.

Worm gear racks for meshing engagement with a driving worm for moving a machine part of a machine tool, for instance, of a stand, are preferably composed of individual gear rack sections each of which has a fraction of the length of the entire gear rack. In this instance, as will be seen from FIG. 9, within the region of the joints of two gear rack sections 1a and 1b, in the illustrated pressure oil feeding bore 8 as well as in the distributing bore 10 sealing bushings 20 are inserted which in a sealing manner bridge the joints and approximately have one half extend into the ends of the bushings 8 and 10 provided in the gear rack sections 1a and 1b which abut each other. More specifically, the seal between the bores 8 and 10, on one hand, and the joints between the gear rack sections 1a and 1b, on the other hand, is provided by sealing rings 28 which extend around the bushing 20 and are located in annular grooves. Such sealing rings may, for instance, be formed by 0-rings. Thus, at the joints no oil under pressure can escape. When employing seals according to the present invention, a high precision at the joints during the manufacture of the gear racks and during the assembly of the elements will not be necessary.

It is, of course, to be understood that the present invention is, by no means, limited to the particular showing in the drawings but also comprises any modifications within the scope of the appended claims.

What I claim is:

1. In combination with a rotatable worm: a machine element forming a machine tool part and being movably connected to said worm for movement thereby, a worm gear rack arranged stationarily and having a portion thereof in meshing engagement with said worm, said machine element being movable by said worm in the longitudinal direction of said rack, the tooth flanks of the teeth of said rack being provided with lubricant receiving pockets, said rack also being provided with lubricant supply conduit means extending in the longitudinal direction of said rack and being adapted to be connected to a source of lubricant under pressure, said rack furthermore being provided with a plurality of control bores serially arranged with regard to each other in the longitudinal direction of said rack and respectively communicating with said supply conduit means while being arranged at least nearly vertically with regard to said supply conduit means, said control bores being spaced from each other by a distance equaling at least one tooth pitch of the teeth of said rack, a plurality of control pistons respectively displaceable in said control bores, said rack also being provided with distributing conduit means interconnecting said control bores and furthermore being provided with connecting bores respectively leading from said distributing conduit means to the respective adjacent tooth flanks of the teeth of said rack for conveying lubricant under pressure to said pockets, each of said control pistons being movable to a first position in which it prevents communication between said lubricant supply conduit means and the respective adjacent connecting bore, spring means respectively associated with said control pistons and continuously urging the pertaining pistons into said first position, each of said control pistons also being movable against the thrust of the pertaining spring means to a second position in which it establishes communication between said lubricant supply conduit means and the respective adjacent connecting bore, and control means connected to said machine element so as to be movable therewith for successively moving the respective control pistons within the range of said control means from said first position to said second position in conformity with the movement of said control means.

2. A combination according to claim 1, in which said control means includes a bar substantially having the length of said worm.

3. A combination according to claim 1, which includes choke means respectively arranged within said connecting bores.

4. A combination according to claim 1, in which each of said control pistons intermediate its ends has a constricted section arranged in continuous communication with said lubricant supply conduit means and having a length shorter than the distance between those wall portions of said supply conduit means and the respective adjacent distributing conduit means which are closest to each other so that communication between said supply conduit means and the respective adjacent distributing conduit means is established by said constricted section in said second position only of the respective control piston.

5. A combination according to claim 1, in which each of said control pistons has two peripheral grooves respectively arranged along two planes transverse to the piston, said two peripheral grooves being spaced from each other so that in said second position only of the respective control piston simultaneously one of its peripheral grooves communicates with said lubricant supply conduit means and the other one of said peripheral grooves communicates with the respective adjacent distributing conduit means, each of said control pistons including transverse bore means respectively communicating with the respective adjacent peripheral groove means and also including longitudinal bore means communicating with and establishing communication between the pertaining peripheral groove means.

6. A combination according to claim 1, in which said worm gear rack is composed of a plurality of sections at least nearly abutting each other and each comprising a portion of said lubricant supply conduit means, and which includes sleeve means respectively inserted in two adjacent portions of said lubricant supply conduit means so as to bridge the gap between adjacent gear rack sections, said sleeve means having outer peripheral grooves therein, and sealing ring means arranged in said outer peripheral groove means for establishing a seal between the interior of said sleeve means and the inner wall of the lubricant supply conduit means section in the respective adjacent gear rack section.

* * * * *